United States Patent
Goiri Presa et al.

(10) Patent No.: US 12,056,521 B2
(45) Date of Patent: Aug. 6, 2024

(54) MACHINE-LEARNING-BASED REPLENISHMENT OF INTERRUPTIBLE WORKLOADS IN CLOUD ENVIRONMENT

(71) Applicant: Microsoft Technology Licensing, LLC, Redmond, WA (US)

(72) Inventors: Inigo Goiri Presa, Redmond, WA (US); Rakesh Akkera, Lynwood, WA (US); Eli Cortez Custodio Vilarinho, Woodinville, WA (US); Felipe Vieira Frujeri, Kirkland, WA (US); Yunus Mohammed, Redmond, WA (US); Thomas Moscibroda, Bellevue, WA (US); Gurpreet Virdi, Redmond, WA (US); Sandeep Kumta Vishnu, Bellevue, WA (US); Yandan Wang, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 517 days.

(21) Appl. No.: 17/467,039

(22) Filed: Sep. 3, 2021

(65) Prior Publication Data
US 2023/0076488 A1   Mar. 9, 2023

(51) Int. Cl.
  *G06F 9/46*   (2006.01)
  *G06F 9/455*   (2018.01)
  *G06F 9/48*   (2006.01)
  *G06F 11/34*   (2006.01)

(52) U.S. Cl.
  CPC ........ *G06F 9/4881* (2013.01); *G06F 9/45558* (2013.01); *G06F 11/3442* (2013.01); *G06F 2009/45562* (2013.01)

(58) Field of Classification Search
  CPC .................................................... G06F 9/4881
  USPC .......................................................... 718/102
  See application file for complete search history.

(56) References Cited

U.S. PATENT DOCUMENTS

| | | | |
|---|---|---|---|
| 9,411,630 B1 * | 8/2016 | Adams | G06F 9/45558 |
| 10,057,185 B1 * | 8/2018 | Burgin | H04L 47/781 |
| 10,067,785 B1 * | 9/2018 | Wei | G06F 9/505 |
| 10,713,072 B1 * | 7/2020 | Burgin | G06F 9/5077 |
| 10,994,198 B1 * | 5/2021 | Byskal | G06F 9/50 |
| 11,210,133 B1 * | 12/2021 | Barker, Jr. | G06F 9/4862 |
| 11,886,932 B1 * | 1/2024 | Dasgupta | G06F 9/4881 |
| 2005/0198303 A1 * | 9/2005 | Knauerhase | G06F 9/5055 |
| | | | 709/227 |

(Continued)

*Primary Examiner* — Mehran Kamran

(57) ABSTRACT

Systems and methods are provided for scheduling a virtual machine (VM) to host a workload in a cloud system. In particular, the disclosed technology schedules an evicted VM for redeploying an interruptible workload. The scheduling is based on capacity prediction and inference data associated with a type of the evicted VM. Capacity signal predictor generates training data for training a machine learning model using capacity signal history data of the cloud system. The machine-learning model, once trained, predicts capacity including a rate of evictions for the types of the evicted VM. The predicted data is based on at least the current status of available computing resources. Upon receiving a notice associated with a workload interruption, the intelligent scheduler prioritizes the evicted VM for scheduling and determines whether to defer redeploying the evicted VM based on the rate of eviction for the type of the evicted VM.

20 Claims, 9 Drawing Sheets

(56) References Cited

U.S. PATENT DOCUMENTS

| | | | | |
|---|---|---|---|---|
| 2012/0227038 A1* | 9/2012 | Hunt | ............... | G06F 9/45558 |
| | | | | 718/1 |
| 2015/0150002 A1* | 5/2015 | Kruglick | ............ | G06F 9/45558 |
| | | | | 718/1 |
| 2016/0321115 A1* | 11/2016 | Thorpe | ............... | G06F 11/3452 |
| 2018/0375787 A1* | 12/2018 | Chen | ............... | H04L 47/823 |
| 2020/0047067 A1* | 2/2020 | Leung | ............... | A63F 13/352 |
| 2020/0142712 A1* | 5/2020 | Liu | ............... | G06F 9/4498 |
| 2021/0004250 A1* | 1/2021 | Arya | ............... | G06F 9/5072 |
| 2021/0247998 A1* | 8/2021 | Zhang | ............... | G06F 9/5083 |
| 2022/0129322 A1* | 4/2022 | Schwartz | ............ | G06F 9/5038 |
| 2022/0276905 A1* | 9/2022 | Manousakis | ......... | G06F 9/5077 |
| 2022/0327002 A1* | 10/2022 | Yang | ............... | G06F 9/5027 |
| 2022/0374276 A1* | 11/2022 | Mitra | ............... | G06Q 30/0201 |
| 2023/0076488 A1* | 3/2023 | Goiri Presa | ......... | G06F 11/3442 |
| 2023/0401103 A1* | 12/2023 | Ram | ............... | G06F 11/3442 |
| 2023/0418661 A1* | 12/2023 | Pasupuleti | ............ | G06F 9/5044 |

\* cited by examiner

300A

| Timestamp 302 | Available VM count 304 | Core Utilization Rate 306 | Hardware Commission Status 308 | Memory Utilization 310 |
|---|---|---|---|---|

| VM Type (size) 320 | Available VMs 322 | Projected Eviction Rate 324 | Projected Usage Pattern 326 |
|---|---|---|---|
| Interruptible/A | 2 | 32 | 10 |
| Interruptible/B | 4 | 24 | 10 |
| Interruptible/C | 8 | 16 | 10 |
| Interruptible/D | 16 | 8 | 10 |

FIG. 3B

MACHINE-LEARNING-BASED REPLENISHMENT OF INTERRUPTIBLE WORKLOADS IN CLOUD ENVIRONMENT

As use of cloud services has become common place, demands for hosting applications and/or workloads in cloud services are increasingly diverse. Some workloads are mission critical, requiring virtual machines that host the workloads to be highly available and non-interruptible. Interruption of the workloads hosted by virtual machines are detrimental to the mission critical services. These types of workloads are non-interruptible. Other types of workloads include stateless applications and short-lived jobs, which can endure interruptions of the workloads without causing substantial issues. These types of workloads are interruptible. These considerations must be balanced by cloud service providers, which host diverse types of workloads with distinct needs while also managing costs of processing, memory, network bandwidth, and other resources.

To address the diverse needs of tenants, cloud service providers support a variety of different virtual machines (VMs) with varying configurations of computing resources for hosting different types of workloads. In some cases, the cloud service providers may evict lower-priority VMs hosting interruptible workloads from execution and reallocate computing resources to higher-priority VMs that need additional computing resources. In aspects, larger, non-interruptible, high priority VMs are charged to customers at a higher rate than smaller, interruptible, low priority VMs.

When computing resources are scarce, cloud service providers may allocate additional computing resources to high priority workloads by "evicting" a VM that is less important (e.g., a VM hosting interruptible workloads). When a VM is evicted, the resources associated with the VM are reallocated to VMs hosting the higher-priority workloads (e.g., non-interruptible workloads). The cloud service provider may attempt to immediately redeploy a VM to handle evicted workloads, but since the high-priority VMs are still in need of the scarce computing resources, the redeployed VM is often evicted shortly after resumption (e.g., typically in order of milliseconds after the resumption) of the interrupted workload. When the cloud service provider evicts (i.e., interrupts) a VM hosting an interruptible workload, a notification of the interruption is sent and the customer may manually redeploy the interrupted workload. An issue arises when the notifications are unnoticed or ignored, causing the interruptible workload to remain evicted for a prolonged period of time until the customer manually places the request to resume execution.

Accordingly, there arises a tension between the need to redeploy VMs sooner than later and the need to prevent immediate evictions of the redeployed VMs after resumption (or replenishing) of the interrupted workload. It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to scheduling an interruptible workload in a cloud system. The present disclosure relates to scheduling a virtual machine (VM) for hosting an interruptible workload in a cloud system. An allocator evicts a VM that hosts an interruptible workload when other higher-priority or non-interruptible VMs need scarce computing resources. An issue arises in queuing the evicted VM for immediate resumption because the redeployed VM may be evicted again in a short period of time. To address the issue, the disclosed technology predicts capacity of available computing resources based on a machine-learning model. An intelligent scheduler adaptively schedules the evicted VM for resumption based on the predicted likelihood of computing capacity availability.

In aspects, the term "virtual machine (VM)" may refer to a set of computing resources. A cloud service provider allocates the computing resources needed to host a workload for execution. The term "workload" may refer to an application and/or a set of program instructions for execution using a VM in the cloud system. The term "interruptible workload" may refer to a workload for which the cloud service provider may interrupt its execution and release computing resources used by the workload. The term "non-interruptible workload" may refer to workloads for which the cloud service provider continues executing the workloads without interruption. The terms "interrupt" and "evict" in controlling a workload and/or a VM may be used interchangeably.

The disclosed technology relates to predicting a resource capacity status using a machine-learning model and scheduling VMs based on the resource capacity status. The disclosure enables deferring resumption of the VMs until a likelihood of the VMs becoming evicted is reasonably low.

A capacity signal predictor generates training data based on capacity signal data. The capacity signal predictor collects the capacity signal data from servers in the cloud system. The capacity signal predictor further trains a machine-learning model based on the training data that may include at least in part the collected capacity signal data. The training may employ various methods associated with machine-learning. The methods may include random forests. A capacity prediction generator uses the machine-learning model to generate inferences associated with computing resource availability and outputs capacity prediction data. The capacity prediction data may include rates of evictions for respective types of VMs. In aspects, a scheduler may schedule an evicted VM based on its priority and the capacity prediction data. Additionally or alternatively, the capacity prediction data may include survivability rates of the respective types of VMs. A survivability rate may indicate a likelihood of a type of VM to remain uninterrupted (i.e., a workload hosted by a VM of the type to remain uninterrupted) in a predetermined time period. By taking the predicted rates of evictions into scheduling, the scheduler effectively reduces the likelihood of evicting the VM immediately after resumption (or replenishment).

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 3A-B illustrate examples of capacity signals and capacity predictions based on workload types in accordance with aspects of the present disclosure.

Figure 4:
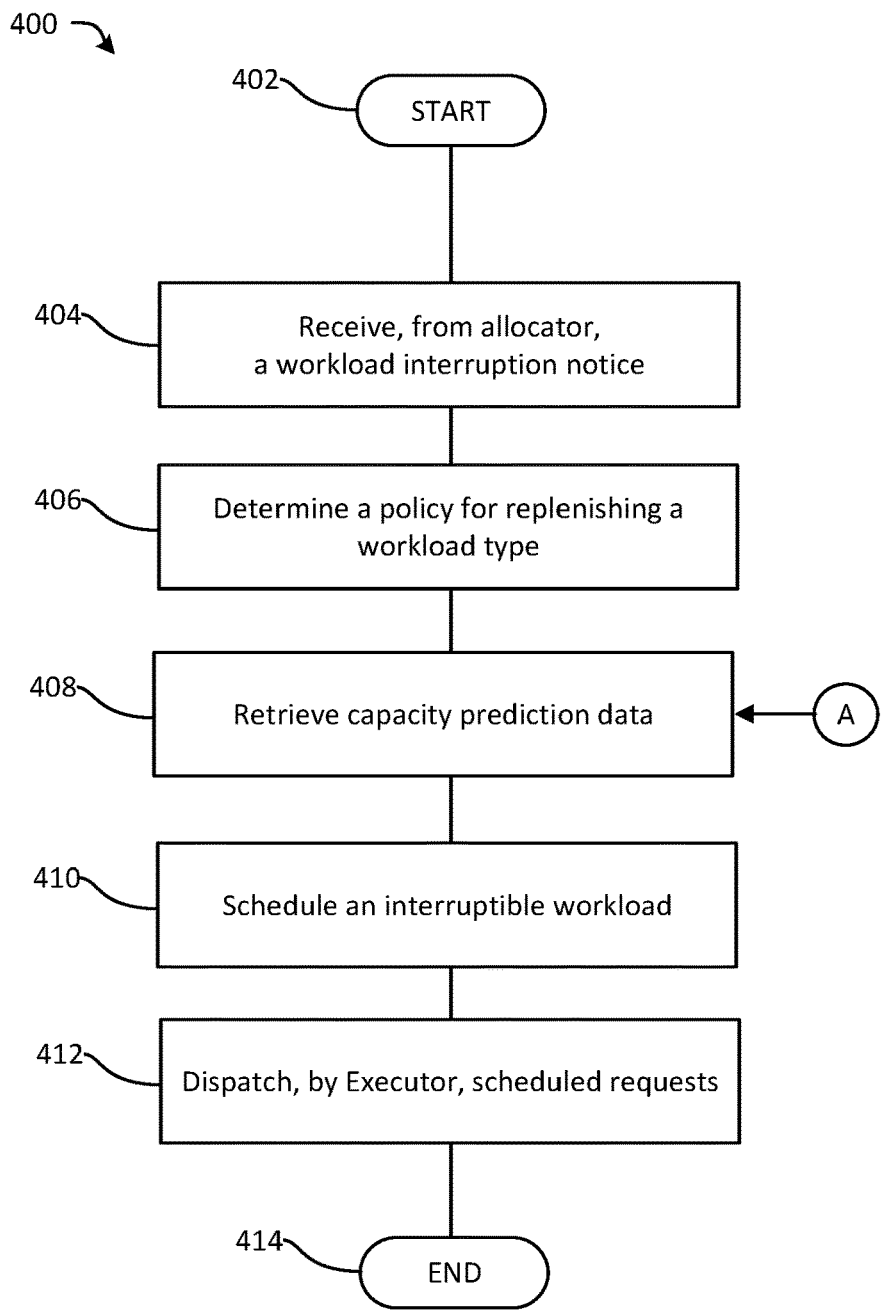

FIG. 4 illustrates an example of a method for scheduling an interruptible workload in accordance with aspects of the present disclosure.

Figure 5:
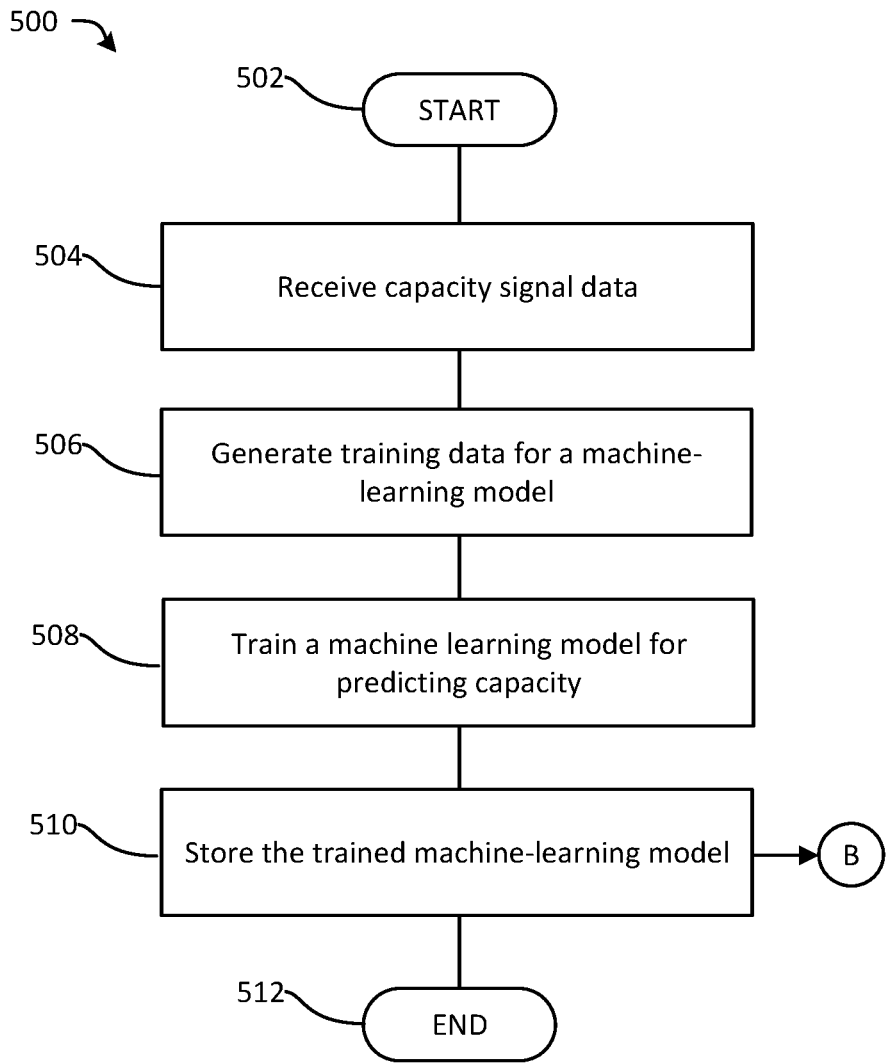

FIG. 5 illustrates an example of a method for training a machine-learning model for capacity prediction in accordance with aspects of the present disclosure.

Figure 6:
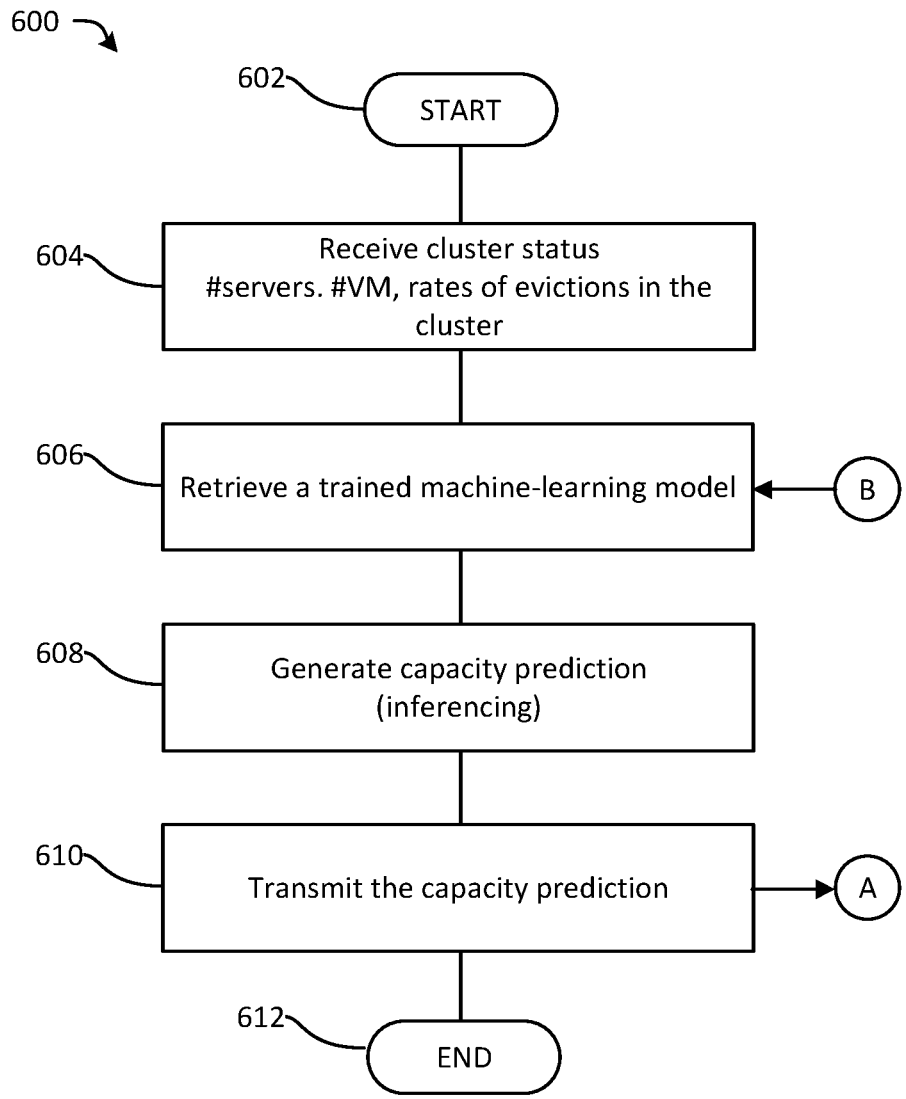

FIG. 6 illustrates an example of a method for generating capacity prediction data in accordance with aspects of the present disclosure.

Figure 7:
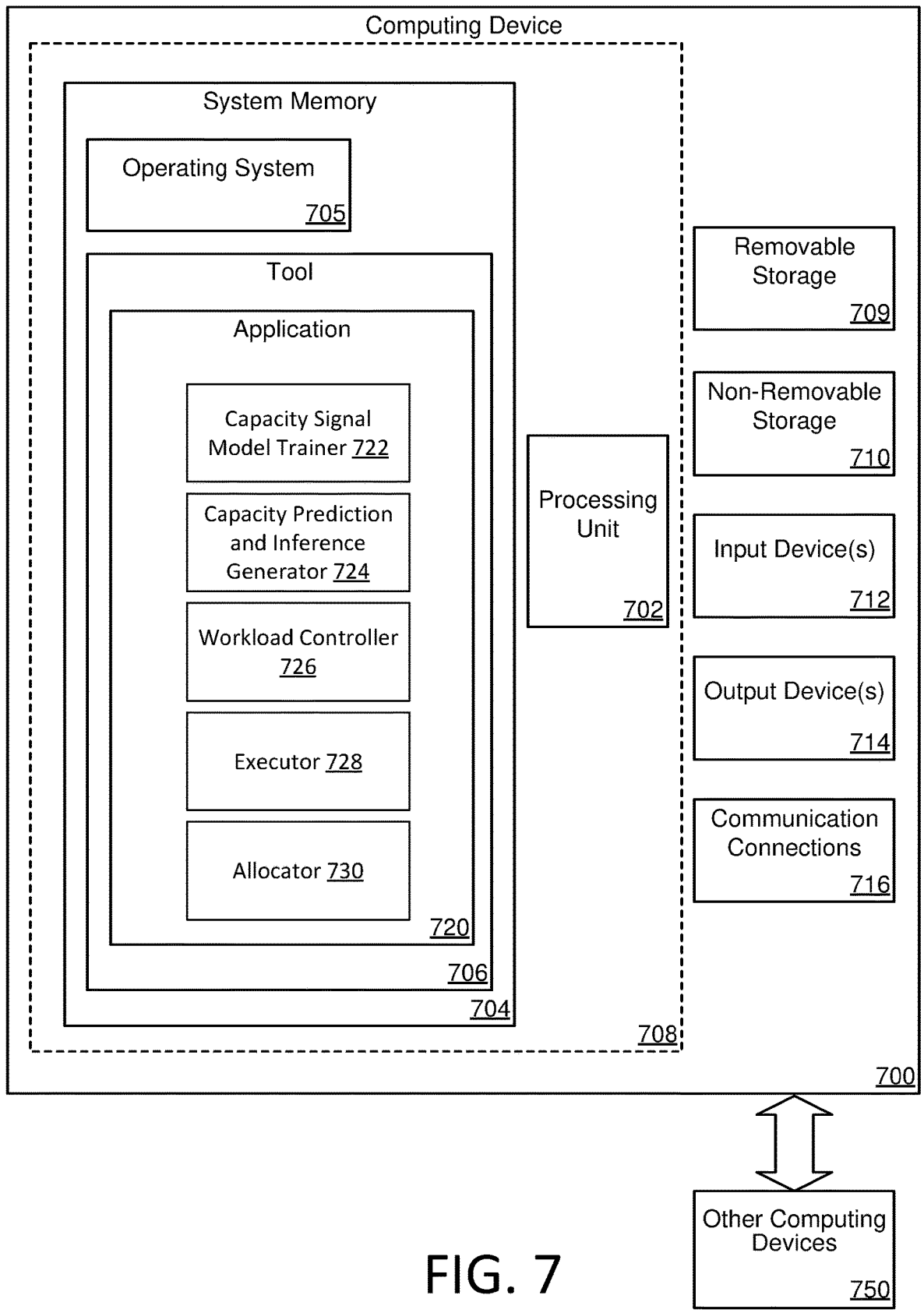

FIG. 7 is a block diagram illustrating example physical components of a computing device with which aspects of the disclosure may be practiced.

Figure 8A:
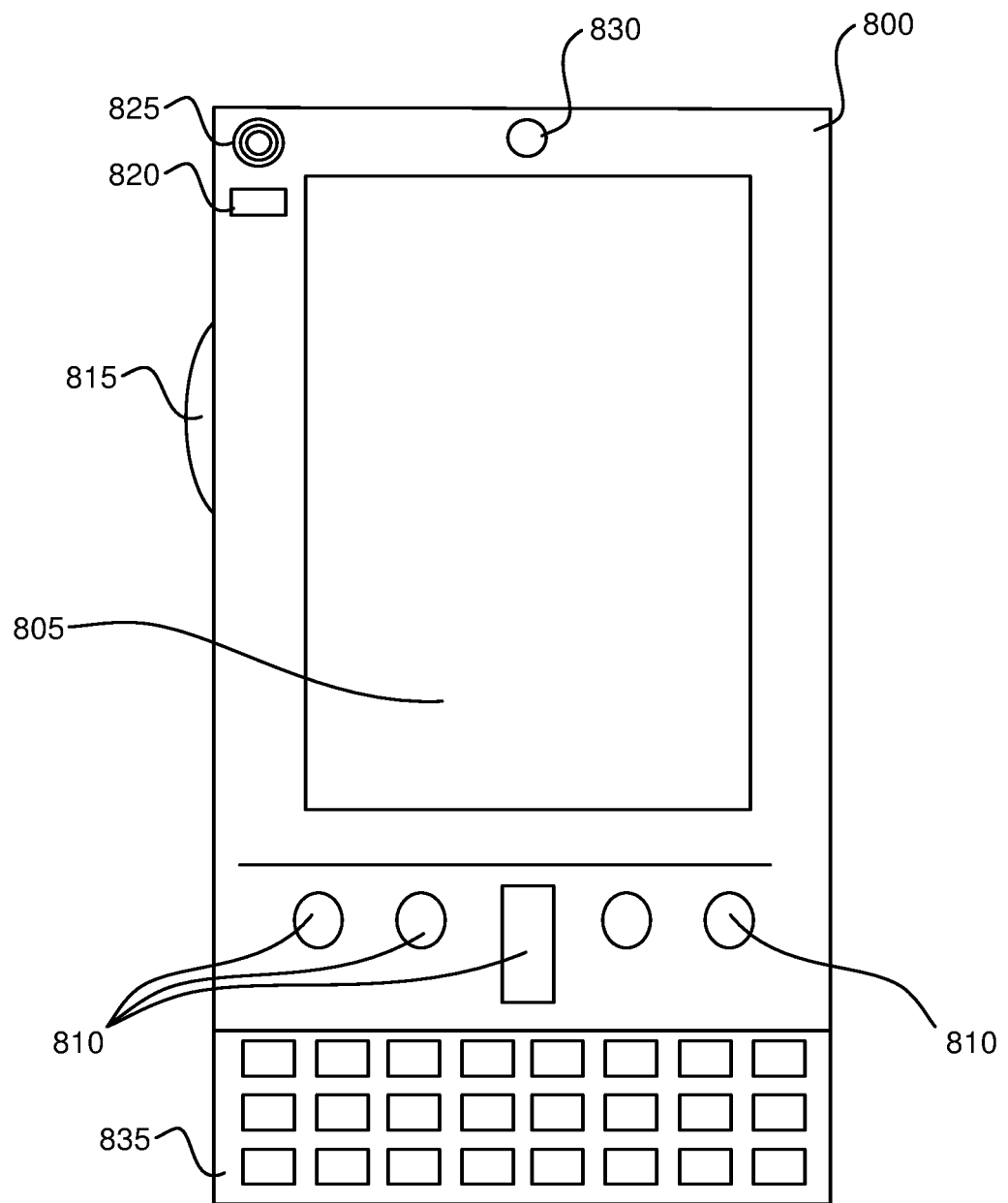

FIG. 8A is a simplified diagram of a mobile computing device with which aspects of the present disclosure may be practiced.

Figure 8B:
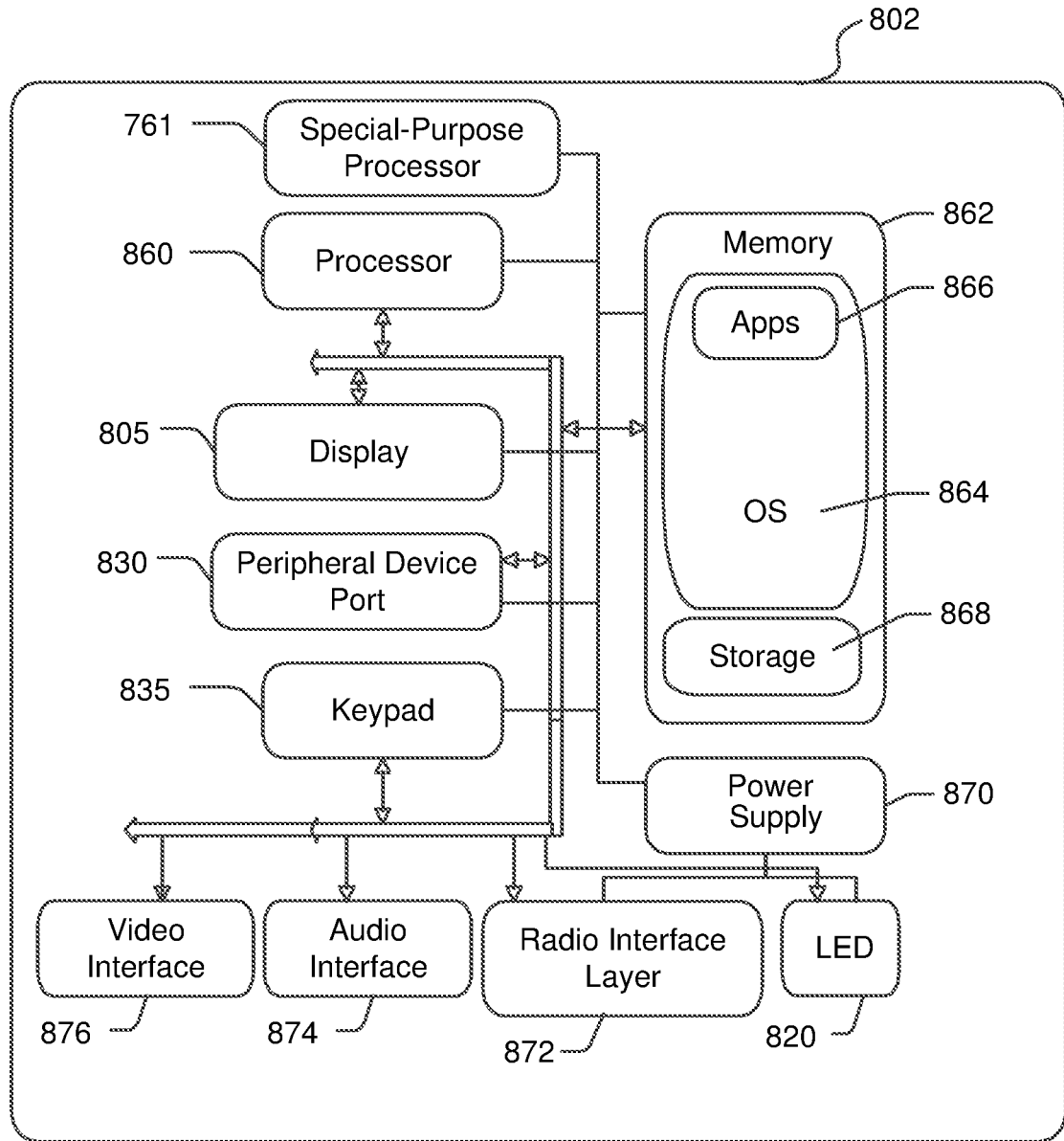

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

A cloud system executes different types of VMs to accommodate distinct types of workloads. For instance, various sizes of VMs may be deployed to host workloads requiring different amounts of computing resources. To provide service elasticity to accommodate varying demands on VMs, the cloud system may reallocate computing resources to high-priority VMs during the peak-hours by evicting VMs that host interruptible workloads, which are lower in priority than non-interruptible workloads.

As discussed in more detail below, the present disclosure relates to scheduling a VM for hosting an interruptible workload. In aspects, the cloud system may routinely monitor availability of computing resources and evict VMs that host interruptible workloads every few minutes. According to aspects, the cloud system uses a trained machine-learning model to predict capacity (i.e., computing resources) available for scheduling various types of evicted VMs.

Figure 1:
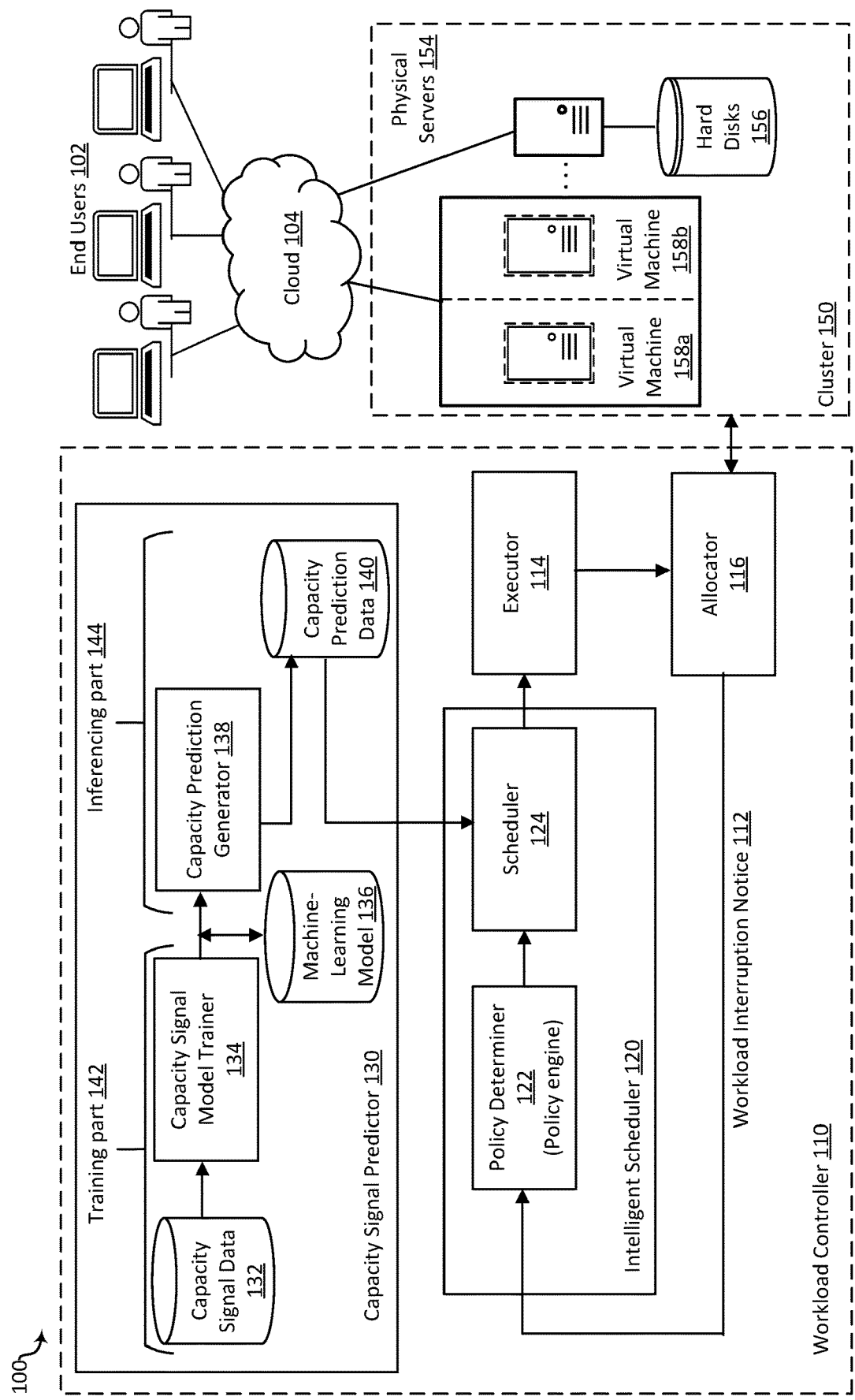
FIG. 1 illustrates an overview of an example system for scheduling an interruptible workload in accordance with aspects of the present disclosure.

FIG. 1 illustrates an overview of an example system 100 for scheduling an interruptible workload in accordance with the aspects of the present disclosure. End users 102 use a cloud service by accessing workloads and applications hosted by virtual machines (VMs) 158a, 158b through cloud 104. The workload controller 110 controls scheduling and execution of workloads. The workload controller 110 may include an intelligent scheduler 120, an executor 114, an allocator 116, and a capacity signal predictor 130. As a part of the cloud service, a cluster 150 may include physical servers 154 with hard disks 156 and other computing resources to execute virtual machines 158a and 158b.

The intelligent scheduler 120 may include a policy determiner 122 and a scheduler 124. The allocator 116 generates a workload interruption notice 112 when the allocator 116 evicts (or interrupts) an interruptible workload from execution on a lower-priority VM. The allocator 116 may release computing resources used by the lower-priority VM and reallocate the released computing resources to a higher-priority VM hosting another workload (e.g., a non-interruptible workload). In aspects, the workload interruption notice 112 may include information associated with the lower-priority VM and information associated with the interrupted workload. The information associated with the lower-priority VM may include a type of the VM (e.g., an amount of computing resources allocated to the VM).

The policy determiner 122 (i.e., a policy engine) determines a queuing policy for scheduling a VM for the interrupted workload. In particular, the policy determiner 122 determines a weight (e.g., a priority) for replenishing (e.g., scheduling, deploying) a redeployed VM. The redeployed VM then hosts the interrupted workload as specified by the workload interruption notice 112. In aspects, the policy determiner 122 determines a policy weight for the evicted workload based on a set of policy rules. One or more of the policy rules may determine weights for the evicted workload. Accordingly the scheduler may selectively queue the evicted workload for resumption on a redeployed VM. For example, a rule may provide higher weightage for workload resumption to higher paying and/or other priority customers.

The scheduler 124 receives capacity prediction data 140 and schedules one or more VMs for resumption of interrupted workloads based on a combination of the policy rule-based weighted queue and projected eviction rates for respective VM types. In aspects, the disclosed technology adaptively redeploys VMs for evicted workloads based on capacity predictions. In particular, the scheduler 124 determines whether to redeploy or not, based on capacity prediction/inference. That is, the scheduler 124 may determine redeployment of the evicted workload should be delayed if the capacity prediction data 140 suggests that the redeployed workload would be evicted again soon after redeployment.

The executor 114 executes a redeployed VM as scheduled by the intelligent scheduler 120. In aspects, the executor dispatches an instruction to the allocator 116 to execute a redeployed VM to resume (i.e., host) an interruptible workload. In some aspects, the executor 114 dispatches the resumption of the interrupted workload to the allocator 116.

The allocator 116 manages execution of a plurality of VMs by allocating and releasing computing resources from lower-priority VMs to accommodate higher-priority VMs. In aspects, the allocator 116 may decide which VMs hosting interruptible workloads to evict based on computing resources that are available and required across the system. There may be various types of situations where the allocator 116 determines whether and when to redeploy a VM to host an evicted workload. For example, the allocator 116 may immediately redeploy a VM for an evicted workload when a machine or system failure caused the eviction and the failed machine or system has recovered and there are sufficient computing resources available to redeploy the VM. In another example, the allocator 116 may defer redeployment of the evicted workload when it is determined that computing resources (i.e., capacity) are insufficient and there is a high likelihood of evicting the workload again if redeployed. In aspects, the disclosed technology allows the scheduler 124 to distinguish a time that is appropriate for redeployment from a time that is appropriate to defer the redeployment.

The capacity signal predictor 130 generates capacity prediction data 140. In aspects, the capacity signal predictor 130 includes two parts: a training part 142 and an inferencing part 144. The training part 142 includes capacity signal data 132, a capacity signal model trainer 134, and a machine-learning model 136. The training part 142 trains a machine-learning model that predicts capacity signals. The capacity signal data 132 includes status data of available capacities and other information in clusters, servers, virtual machines, and the like. The capacity signal model trainer 134 trains the machine-learning model 136 using the capacity signal data 132 as training data.

In aspects, the machine-learning model 136 may be based on a random forest. In some other aspects, the machine-learning model 136 may be based on other structures including but not limited to a neural network. The disclosed technology may incorporate one or more of a variety of types of machine-learning models for generating inferences and/or prediction data.

The inferencing part generates capacity prediction data 140 by inferencing based on machine-learning model 136 (e.g., trained model). In aspects, the capacity prediction generator 138 retrieves a snapshot of available resource capacity. The capacity prediction generator 138 uses the machine-learning model 136 and infers the capacity prediction data 140. The capacity prediction data 140 may be specific to respective types of virtual machines, which may be based on an amount of computing resources allocated to a virtual machine. For example, a number of processing cores allocated to a virtual machine may be used to express a size of the virtual machine. Types of VMs may be expressed by a number of VM "cores" (e.g., four cores) or memory consumed by the VM. These factors may be taken into consideration when determining which nodes or clusters of servers have sufficient capacity to redeploy the VM.

In aspects, the capacity signal predictor 130 may execute the training part 142 and the inferencing part 144 in distinct intervals. For example, the training part 142 may execute on a weekly basis, while the inferencing part 144 may execute more frequently (e.g., every 10 minutes).

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
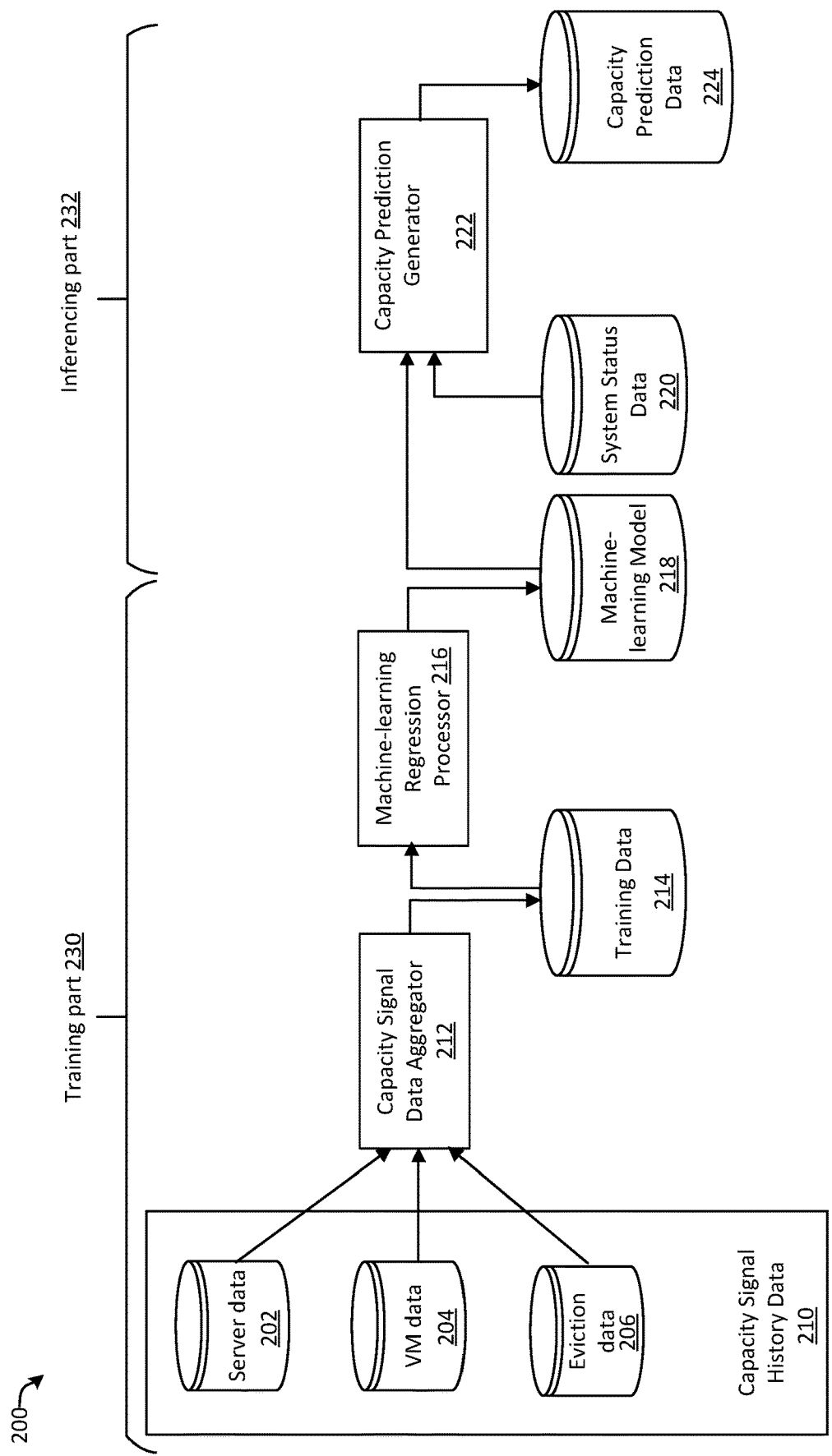
FIG. 2 illustrates an example system for predicting capacity signals using a machine-learning model in accordance with aspects of the present disclosure.

FIG. 2 illustrates an example system for generating capacity prediction data using a machine-learning model in accordance with aspects of the present disclosure. The system 200 (e.g., the capacity signal predictor 130 as shown in FIG. 1) includes a training part 230 and an inferencing part 232. The training part 230 trains a machine-learning model for predicting a capacity of available computing resources. In aspects, the training part 230 includes capacity signal history data 210, a capacity signal data aggregator 212, training data 214, a machine-learning regression processor 216, and a machine-learning model 218. The capacity signal history data 210 is a set of historical records including capacity signals from various aspects of the cloud system. For example, the capacity signals may include a snapshot of capacity statuses of computing resources in servers, VMs, a number of interruptible workloads being evicted from VMs and/or a number of VMs available for resumption, and the like.

In some aspects, the capacity signal history data 210 may include server data 202, VM data 204, and eviction data 206. The server data 202 may include capacity statuses of computing resources including memory utilization rates in respective servers (e.g., physical servers 154, as shown in FIG. 1). The VM data 204 may also include a number of respective types of VMs available for resumption of evicted workloads. Types of VMs may be, for example, based on an amount of computing resources allocated to a VM for processing workloads. The eviction data 206 may include a rate of evictions (e.g., a number of workloads that an allocator evicted in a predefined time interval). The eviction data 206 may further include a list of VMs and types of VMs from which workloads have been evicted. The allocator reallocates the resources of one or more VMs to other high-priority VMs (and/or non-interruptible VMs) that need additional computing resources, causing one or more workloads to be evicted. The allocator may then reallocate computing resources that become available to redeploy VMs for resumption of the evicted workloads.

The capacity signal data aggregator 212 aggregates the capacity signal history data 210 from the various sources and generates training data 214 for training a machine-learning model 218. In aspects, the training data 214 may include ground truth examples of a time duration of interrupted workloads until the allocator redeploys a VM under a given state as described by capacity signals. In some aspects, the capacity signal data aggregator 212 generates the training data 214 in predetermined time intervals (e.g., on a weekly basis). The training data may include at least a part of the collected capacity signal data.

The machine-learning regression processor 216 performs regressions using the training data 214 and trains the machine-learning model 218. In aspects, the regression uses random forests as a method for regression. In particular, the method based on random forests may include generating decision trees for training the machine-learning model 218. Once trained, the machine-learning model 218 enables generating capacity prediction data 224. The disclosed technology does not limit the machine-learning regression to random forests. Additionally or alternatively, other supervised and/or unsupervised learning of the model may be utilized. In some aspects, the machine-learning model 218 may be based on one or more neural networks and/or decision trees.

The inferencing part 232 includes a capacity prediction generator 222. The capacity prediction generator 222 retrieves the trained machine-learning model 218 and system status data 220. The system status data 220 may include a snapshot of statuses of computing resources consumed and/or available in the cloud (or on a set of servers with virtual machines). For example, the capacity prediction generator 222 predicts capacity available and eviction rates on respective types of VMs. The capacity prediction generator 222 generates capacity prediction data 224. In aspects, the capacity prediction data 224 includes predicted eviction rates (e.g., a number of workloads that the allocator evicts in a predetermined time period) for respective types (e.g., sizes, a number of cores) of VMs. Additionally or alternatively, the capacity prediction data 224 may include survivability rates of the respective types of VMs. A survivability rate may indicate a likelihood of a type of VM to remain uninterrupted (i.e., the workload hosted by a VM of the type to remain uninterrupted without eviction) in a predetermined time period. In aspects, the inferencing part 232 may store the capacity prediction data 224 and a workload scheduler (e.g., the scheduler 124 as shown in FIG. 1) retrieves the data.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

FIGS. 3A-B illustrate examples of capacity signals and capacity prediction data in accordance with the aspects of the present disclosure. FIG. 3A illustrates an example of capacity signals data 300A. In aspects, the capacity signals includes a snapshot of time-sensitive available capacity information (a number VMs available, memory utilizations, etc.) and property attributes of computing resources (e.g., configurations and capacities of servers). In aspects, the capacity signals may include a timestamp 302 of capturing the capacity signals from the cloud system, available VM count 304, core utilization rate 306, hardware commission status 308, memory utilization 310, and the like. The available VM count 304 may be generated for respective types of VMs. Core utilization rate 306 may depict a rate of VM cores in use. The hardware commission status 308 may describes whether respective hardware (e.g., servers) is in commission or being decommissioned. The memory utilization 310 may describe a percentage of memory in use to process workloads. In aspects, the capacity signals data 300A may be a part of the capacity signal history data 210 as shown in FIG. 2.

FIG. 3B illustrates the example capacity prediction data 300B (e.g., the capacity prediction data 224 as shown in FIG. 2). In aspects, the prediction data may include VM type (size) 320, available VMs 322, projected eviction rate 324, projected usage pattern 326, and the like. The prediction data may indicate predicted feasibility of redeploying respective types of VMs for hosting evicted workloads without being evicted immediately after resumption. In contrast to a traditional resumption of workloads, which is immediately after eviction, the disclosed technology uses the capacity prediction data to defer the resumption of workloads until a predicted eviction rate is less than a predetermined threshold. Deferring the resumption until the eviction rate is reasonably low enables continuing execution of workloads for a reasonable amount of time without being evicted again.

In aspects, the VM type 320 indicates respective VM types. For example, a size of VM (e.g., a number of VM cores) describes a type of the VM. The available VMs 322 may indicate a number of VMs available for resumption based on the type of the VM. The projected eviction rate 324 indicates a rate of eviction (e.g., a likelihood of evicting a workload on the type of VM in a predetermined time). When the rate of eviction is higher than a predetermined threshold, the workload is likely to be evicted again in the predetermined time. By scheduling a VM when the rate of eviction for the type of VM is lower than the predetermined threshold, the VM is likely to continue execution of a workload without being evicted. The projected usage pattern 326 may indicate a relative available capacity within a predetermined time window. For example, the projected usage pattern value of zero indicates no deferrable VM should be scheduled, whereas a value of ten means that resources are sufficiently available to schedule VMs.

FIG. 4 illustrates an example of a method for scheduling an interruptible workload using a machine-learning model in accordance with aspects of the present disclosure. A general order of the operations for the method 400 is shown in FIG. 4. Generally, the method 400 begins with start operation 402 and ends with end operation 414. The method 400 may include more or fewer steps or may arrange the order of the steps differently than those shown in FIG. 4. The method 400 can be executed as a set of computer-executable instructions executed by a cloud system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1, 2, 3A-B, 5, 6, 7, and 8A-B.

Following start operation 402, the method 400 begins with receive operation 404, in which an intelligent scheduler (e.g., the intelligent scheduler 120 as shown in FIG. 1) receives, from the allocator, a workload interruption notification. In aspects, the workload interruption notification includes information associated with evicting a workload from a specific VM that had hosted the workload. For example, the notification may include an identifier of the VM associated with the workload, time of the eviction, and a type of the workload.

Determine operation 406 determines a policy for replenishing (i.e., resumption of) computing resources (e.g., a VM) associated with the type of VM that hosted the evicted workload. In aspects, the policy includes a set of rules for determining weights to generate a prioritized queue of VMs for resumption.

Retrieve operation 408 retrieves capacity prediction data. In aspects, as marked by the label "A," the scheduler (e.g., the scheduler 124 as shown in FIG. 1) retrieves the capacity prediction data (e.g., the capacity prediction data 140 as shown in FIG. 1).

Schedule operation 410 schedules an interruptible workload based on a combination of the prioritized queue that reflects the policy and the capacity prediction data. Use of the capacity prediction data enables the scheduler to schedule a VM when a likelihood that the VM will continue executing without eviction/interruption for a predetermined time.

Dispatch operation 412 dispatches, by the executor, the scheduled requests for execution. In aspects, the executor may request the allocator to allocate computing resources needed to execute the VM. Once allocated, the allocator may start execution of the VM that hosts a workload. The method 400 ends with the end operation 414.

As should be appreciated, operations 402-414 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5 illustrates an example of a method for training a machine-learning model for predicting capacity in accordance with aspects of the present disclosure. A general order of the operations for the method 500 is shown in FIG. 5. Generally, the method 500 begins with start operation 502 and ends with end operation 512. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3A-B, 4, 6, 7, and 8A-B.

Following start operation 502, the method 500 begins with receive operation 504, which receives capacity signal data. In aspects, the capacity signal data describes various statuses associated with capacity of resources available and in use as a history of various computing resources in the cloud system. For example, the capacity signal data may include configurations and setups of servers in clusters and regions of the cloud, a number of servers and racks, a number of VMs and respective types of VMS that can be allocated. Additionally or alternatively, the capacity signal data may include utilization rates of computing resources (e.g., a number of VMs running, Central Processing Unit (CPUs) and memory allocated for respective VMs). In aspects, the capacity signal predictor may store the capacity signal data over a period of time. The capacity signal predictor may receive the capacity signal data periodically (e.g., every week).

Generate operation 506 generates training data for a machine-learning model using the received capacity signal data. In aspects, the training data describes how VMs of respective types become reallocated by the allocator (thereby evicting workloads) at a given availability of computing resources.

Train operation 508 trains the machine-learning model for predicting capacity. In aspects, the train operation uses random forests for processing regression using the training data. For example, the method of random forests may include generating a directed tree that depicts conditions where the allocator evicts/interrupts a VM. In some other aspects, the train operation 508 trains a machine-learning model using a method associated with building a neural network and/or other methods.

Store operation 510 stores the trained machine-learning model for use by the capacity prediction generator (e.g., the capacity prediction generator 138 as shown in FIG. 1) to predict capacity. The label "B" depicts the trained machine-learning model used in the retrieve operation 606 of FIG. 6. The method 500 ends with the end operation 512.

As should be appreciated, operations 502-512 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6 illustrates an example of a method for generating capacity prediction data in accordance with aspects of the present disclosure. A general order of the operations for the method 600 is shown in FIG. 6. Generally, the method 600 begins with start operation 602 and ends with end operation 612. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3A-B, 4, 5, 7, and 8A-B.

Following start operation 602, the method 600 begins with receive operation 604, which receives cluster status information. In aspects, a cluster (e.g., the cluster 150 as shown in FIG. 1) is a set of virtual servers and physical servers controlled by a workload controller (e.g., the workload controller 110 as shown in FIG. 1). The cluster may represent a set of computing resources used to host workloads. The cluster status may include, but is not limited to, a number of physical servers, a number of virtual servers, rates of evictions of various types of VMs in the cluster, and the like.

Retrieve operation 606 retrieves a trained machine-learning model. The label "B" indicates that the trained machine-learning model is associated with the machine-learning model that is stored in the store operation 510 of FIG. 5. The trained machine-learning model enables predicting capacity of available resources and rates of evictions of workloads on VMs in a given set of cluster status.

Generate operation 608 generates capacity prediction data. In aspects, the generate operation 608 may include processing inferences based on the cluster status according to the machine-learning model. For example, the capacity prediction data may predict that a number of workloads likely to be evicted in a predetermined time period after resumption is the same as a number of available VMs for resumption. The rate would indicate that likelihood of the workloads being evicted shortly after resumption is high. The intelligent scheduler, based on the value of the eviction rate, may defer scheduling the workloads at some later time as the rates of eviction may decrease over time.

In aspects, the intelligent scheduler maintains data including maximum eviction rates associated with workloads hosted by respective types of VMs. The intelligent scheduler schedules a redeployment of a VM of a type by comparing the capacity prediction data against a projected eviction rate for workloads hosted by the type of VM. The intelligent scheduler schedules a VM for redeployment when the capacity prediction data associated with a type of the VM includes a projected eviction rate that is lower in value than the maximum eviction rate associated with the type of VM. In some aspects, capacity prediction data may indicate a percentage of likelihood for a workload hosted by a particular type of VM to survive without being evicted for a predetermined time period.

Transmit operation 610 transmits the capacity prediction data. In aspects, the transmit operation 610 may store the capacity prediction data in a memory storage. The scheduler (e.g., the scheduler 124 as shown in FIG. 1) may retrieve the capacity prediction data. The label "A" indicates that the capacity prediction data corresponds to the data retrieved for use in the retrieve operation 408 in FIG. 4. The method 600 ends with the end operation 612.

As should be appreciated, operations 602-612 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a capacity signal model trainer 722, a capacity signal inference generator 724, a workload controller 726, an executor 728, and an allocator 730 as described in more detail with regard to FIG. 1.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an end users 102 or a customer of the cloud service in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the virtual machines 158a and 158b and the physical servers 154 in the cluster 150, the workload controller 110, other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for scheduling an execution of a workload in a cloud server according to at least the examples provided in the sections below. The method comprises receiving a notification associated with a workload interruption, wherein the notification identifies an interrupted workload and includes a virtual machine (VM) type associated with the interrupted workload; determining a queuing policy associated with the interrupted workload; retrieving capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type; scheduling, based on a combination of the queuing policy and the predicted eviction rate, a redeployed VM for hosting the interrupted workload; and causing a dispatch to execute the redeployed VM for hosting the interrupted workload, wherein the dispatch causes allocation of available computing resources for the redeployed VM based on the VM type. The method further comprises receiving system status data associated with available computing resources in the cloud server; retrieving the trained machine-learning model for predicting the capacity of available computing resources for allocation to the VM type; generating, based on the trained machine-learning model, the capacity prediction data; and transmitting the capacity prediction data. The method further comprises receiving capacity signal history data, wherein the capacity signal history data includes history data associated with available computing resources for allocation to the VM type in the cloud server; generating, based on the received capacity signal data, training data for a machine-learning model; training the machine-learning model for predicting the capacity of available computing resources for allocation to the VM type; and storing the trained machine-learning model. The notification associated with the workload interruption includes the VM type associated with hosting the interrupted workload, and wherein the VM type corresponds to an amount of computing resources allocated to the VM. The interrupted workload corresponds to one or more of an application program, a set of instructions, or a job. The capacity signal history data includes one or more of server data, VM data, or eviction data including history data associated with evicting workloads from VMs. The trained machine-learning model is generated based on one or more of random forests and a neural network.

Another aspect of the technology relates to a system for scheduling an execution of a workload in a cloud server. The system comprises a processor; and a memory storing computer-executable instructions that when executed by the processor cause the system to: receive a notification associated with a workload interruption, wherein the notification identifies an interrupted workload and includes a virtual machine (VM) type associated with the interrupted workload; determine a queuing policy associated with the interrupted workload; retrieve capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type; schedule, based on a combination of the queuing policy and the predicted eviction rate, a redeployed VM for hosting the interrupted workload; and cause a dispatch to execute the redeployed VM for hosting the interrupted workload, wherein the dispatch causes allocation of available computing resources for the redeployed VM based on the VM type. The computer-executable instructions when executed further cause the system to receive system status data associated with available computing resources in the cloud server; retrieve the trained machine-learning model for predicting the capacity of available computing resources for allocation to the VM type; generate, based on the trained machine-learning model, the capacity prediction data; and transmit the capacity prediction data. The computer-executable instructions when executed further cause the system to receive capacity signal history data, wherein the capacity signal history data includes history data associated with available computing resources for allocation to the VM type in the cloud server; generate, based on the received capacity signal data, training data for a machine-learning model; train the machine-learning model for predicting the capacity of available computing resources for allocation to the VM type; and store the trained machine-learning model. The notification associated with the workload interruption includes the VM type associated with hosting the interrupted workload, and wherein the VM type corresponds to an amount of computing resources allocated to the VM. The interrupted workload corresponds to one or more of an application program, a set of instructions, or a job. The capacity signal history data includes one or more of server data, VM data, or eviction data including history data associated with evicting workloads from VMs. The trained machine-learning model is generated based on one or more of random forests and a neural network.

In still further aspects, the technology relates to a computer-readable recording medium storing computer-executable instructions. The computer-executable instructions that when executed by a processor cause a computer system for scheduling an execution of a workload in a cloud server to receive a notification associated with a workload interruption, wherein the notification identifies an interrupted workload and includes a virtual machine (VM) type associated with the interrupted workload; determine a queuing policy associated with the interrupted workload; retrieve capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type; schedule, based on a combination of the queuing policy and the predicted eviction rate, a redeployed VM for hosting the interrupted workload; and cause a dispatch to execute the redeployed VM for hosting the interrupted workload, wherein the dispatch causes allocation of available computing resources for the redeployed VM based on the VM type. The computer-executable instructions when executed further cause the system to receive system status data associated with available computing resources in the cloud server; retrieve the trained machine-learning model for predicting the capacity of available computing resources for allocation to the VM type; generate, based on the trained machine-learning model, the capacity prediction data; and transmit the capacity prediction data. The computer-executable instructions when executed further cause the system to receive capacity signal history data, wherein the capacity signal history data includes history data associated with available computing resources for allocation to the VM type in the cloud server; generate, based on the received capacity signal data, training data for a machine-learning model; train the machine-learning model for predicting the capacity of available computing resources for allocation to the VM type; and store the trained machine-learning model. The notification associated with the workload interruption includes the VM type associated with hosting the interrupted workload, and wherein the VM type corresponds to an amount of computing resources allocated to the VM. The interrupted workload corresponds to one or more of an application program, a set of instructions, or a job. The capacity signal history data includes one or more of server data, VM data, or eviction data including history data associated with evicting workloads from VMs, and wherein the trained machine-learning model is generated based on one or more of random forests, and a neural network.

Any of the one or more above aspects in combination with any other of the one or more aspect. Any of the one or more aspects as described herein.

What is claimed is:

1. A computer-implemented method for scheduling an execution of a workload in a cloud server, the method comprising:
   receiving a notification associated with a workload interruption, wherein the notification identifies an interrupted workload and includes a virtual machine (VM) type associated with the interrupted workload;
   determining a queuing policy associated with the interrupted workload;
   retrieving capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type;
   scheduling, based on a combination of the queuing policy and the predicted eviction rate, a redeployed VM for hosting the interrupted workload; and
   causing a dispatch to execute the redeployed VM for hosting the interrupted workload, wherein the dispatch causes allocation of available computing resources for the redeployed VM based on the VM type.

2. The computer-implemented method according to claim 1, the method further comprising:
   receiving system status data associated with available computing resources in the cloud server;
   retrieving the trained machine-learning model for predicting the capacity of available computing resources for allocation to the VM type;
   generating, based on the trained machine-learning model, the capacity prediction data; and
   transmitting the capacity prediction data.

3. The computer-implemented method according to claim 1, the method further comprising:
   receiving capacity signal history data, wherein the capacity signal history data includes history data associated with available computing resources for allocation to the VM type in the cloud server;
   generating, based on the received capacity signal data, training data for a machine-learning model;
   training the machine-learning model for predicting the capacity of available computing resources for allocation to the VM type; and
   storing the trained machine-learning model.

4. The computer-implemented method according to claim 1, wherein the notification associated with the workload interruption includes the VM type associated with hosting the interrupted workload, and wherein the VM type corresponds to an amount of computing resources allocated to the VM.

5. The computer-implemented method according to claim 1, wherein the interrupted workload corresponds to one or more of:
   an application program,
   a set of instructions, or
   a job.

6. The computer-implemented method according to claim 3, wherein the capacity signal history data includes one or more of:
   server data,
   VM data, or
   eviction data including history data associated with evicting workloads from VMs.

7. The computer-implemented method according to claim 1, wherein the trained machine-learning model is generated based on one or more of:
   random forests, and
   a neural network.

8. A system for scheduling an execution of a workload in a cloud server, the system comprising:
   a processor; and
   a memory storing computer-executable instructions that when executed by the processor cause the system to:
      receive a notification associated with a workload interruption, wherein the notification identifies an interrupted workload and includes a virtual machine (VM) type associated with the interrupted workload;
      determine a queuing policy associated with the interrupted workload;
      retrieve capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type;
      schedule, based on a combination of the queuing policy and the predicted eviction rate, a redeployed VM for hosting the interrupted workload; and
      cause a dispatch to execute the redeployed VM for hosting the interrupted workload, wherein the dispatch causes allocation of available computing resources for the redeployed VM based on the VM type.

9. The system of claim 8, the computer-executable instructions when executed further cause the system to:
   receive system status data associated with available computing resources in the cloud server;
   retrieve the trained machine-learning model for predicting the capacity of available computing resources for allocation to the VM type;
   generate, based on the trained machine-learning model, the capacity prediction data; and
   transmit the capacity prediction data.

10. The system of claim 8, the computer-executable instructions when executed further cause the system to:
    receive capacity signal history data, wherein the capacity signal history data includes history data associated with available computing resources for allocation to the VM type in the cloud server;
    generate, based on the received capacity signal data, training data for a machine-learning model;
    train the machine-learning model for predicting the capacity of available computing resources for allocation to the VM type; and
    store the trained machine-learning model.

11. The system of claim 8, wherein the notification associated with the workload interruption includes the VM type associated with hosting the interrupted workload, and wherein the VM type corresponds to an amount of computing resources allocated to the VM.

12. The system of claim 8, wherein the interrupted workload corresponds to one or more of:
    an application program,
    a set of instructions, or
    a job.

13. The system of claim 10, wherein the capacity signal history data includes one or more of:
  server data,
  VM data, or
  eviction data including history data associated with evicting workloads from VMs.

14. The system of claim 8, wherein the trained machine-learning model is generated based on one or more of:
  random forests, and
  a neural network.

15. A computer storage media storing computer-executable instructions that when executed by a processor cause a computer system for scheduling an execution of a workload in a cloud server to:
  receive a notification associated with a workload interruption, wherein the notification identifies an interrupted workload and includes a virtual machine (VM) type associated with the interrupted workload; determine a queuing policy associated with the interrupted workload;
  retrieve capacity prediction data, wherein the capacity prediction data includes a predicted eviction rate of the VM type associated with the interrupted workload, and wherein the predicted eviction rate is generated using a trained machine-learning model to predict a capacity of available computing resources for allocation to the VM type;
  schedule, based on a combination of the queuing policy and the predicted eviction rate, a redeployed VM for hosting the interrupted workload; and
  cause a dispatch to execute the redeployed VM for hosting the interrupted workload, wherein the dispatch causes allocation of available computing resources for the redeployed VM based on the VM type.

16. The computer storage media of claim 15, the computer-executable instructions when executed further cause the system to:
  receive system status data associated with available computing resources in the cloud server;
  retrieve the trained machine-learning model for predicting the capacity of available computing resources for allocation to the VM type;
  generate, based on the trained machine-learning model, the capacity prediction data; and
  transmit the capacity prediction data.

17. The computer storage media of claim 15, the computer-executable instructions when executed further cause the system to:
  receive capacity signal history data, wherein the capacity signal history data includes history data associated with available computing resources for allocation to the VM type in the cloud server;
  generate, based on the received capacity signal data, training data for a machine-learning model;
  train the machine-learning model for predicting the capacity of available computing resources for allocation to the VM type; and
  store the trained machine-learning model.

18. The computer storage media of claim 15, wherein the notification associated with the workload interruption includes the VM type associated with hosting the interrupted workload, and wherein the VM type corresponds to an amount of computing resources allocated to the VM.

19. The computer storage media of claim 15, wherein the interrupted workload corresponds to one or more of:
  an application program,
  a set of instructions, or
  a job.

20. The computer storage media of claim 15,
  wherein the capacity signal history data includes one or more of:
  server data,
  VM data, or
  eviction data including history data associated with evicting workloads from VMs, and
  wherein the trained machine-learning model is generated based on one or more of:
  random forests, and
  a neural network.

* * * * *